United States Patent Office 2,847,275
Patented Aug. 12, 1958

2,847,275

URANIUM RECOVERY PROCESS

James H. Yeager, St. Louis, Mo., assignor to the United States of America as represented by the United States Atomic Energy Commission No Drawing. Application January 4, 1955
Serial No. 479,873

6 Claims. (Cl. 23—14.5)

This invention deals with an improved method of processing uranium-containing materials such as uranium ores, and in particular with the recovery of the uranium from such materials by solvent extraction.

In extraction procedures of ores, the ore is customarily dissolved in an acid and the solution obtained thereby separated from any residue of insolubles, such as the gangue cake. The solution is then contacted with an organic, substantially water-immiscible solvent which selectively extracts some of the metal values present, usually those to be recovered. In order to remove from the solvent extract thus formed minor quantities of the less extractable values that have also been taken up by the solvent, a scrubbing procedure with an aqueous medium is usually applied to the solvent extract. After this the extracted values are removed from the solvent extract by back-extraction with water or an aqueous medium and the solvent is thereby regenerated for reuse.

In the case of uranium ores the raw material is usually digested with a strongly ionizing acid, preferably with nitric acid, and the insolubles are removed by filtration prior to subjecting the solution to solvent extraction. It has been found that a considerable part of the uranium is held by the residue, possibly by adsorption, and that therefore the uranium loss is considerable. For this reason a separate processing cycle was found necessary in order to recover the uranium held by the insolubles.

It is an object of this invention to provide a process for the recovery of uranium values from uranium-containing materials by solvent extraction by which the disadvantages discussed above are overcome.

It is another object of this invention to provide a process for the recovery of uranium values from uranium-containing materials by solvent extraction in which the uranium loss is very nominal and a high efficiency is thus accomplished.

It is still another object of this invention to provide a process for the recovery of uranium values from uranium-containing materials by solvent extraction in which filtration is eliminated.

It is also an object of this invention to provide a process for the recovery of uranium values from uranium-containing materials by solvent extraction which requires less operation, in particular no filtration and no second extraction cycle, and thus is more economical; the equipment for the process of this invention also requires less floor space than previous processes.

It is finally also an object of this invention to provide a process for the recovery of uranium values from uranium-containing materials by solvent extraction in which the separate processing of acid-insoluble residues is not necessary.

These and other objects are accomplished by adding a strongly ionizing acid to the uranium-containing material, digesting the mixture obtained thereby whereby a digest slurry is produced, contacting said slurry with an organic, substantially water-immiscible solvent whereby the uranium values in the solid as well as those in the liquid part of the slurry are taken up by said solvent and an extract phase is thus formed, and separating said extract phase from a slurry raffinate.

The process of this invention is applicable to a great variety of uranium-containing materials, in particular to uranium ores such as pitchblende, and to concentrates obtained during the processing of uranium-containing ores or other raw materials such as black oxide, which principally is $U_3O_8$. Another product for which the process has been found advantageous is the so-called "MgX" which is a chemical precipitate that has been prepared in the Congo by adding magnesium hydroxide to a sulfuric acid leach solution of low-grade pitchblende ore; this slurry is digested with nitric acid of about 45% concentration at a temperature between 38 and 66° C. prior to extraction. A mixture of the raw materials just listed and of many others may also be used for the recovery process of this invention.

In Table I below, the compositions of pitchblende and MgX as typical representatives are given.

TABLE I

| Component | Percent by Weight | |
|---|---|---|
| | Pitchblende | "MgX" |
| $H_2O$ | 0.75 | 3.6 |
| U | 35.3 | 27.0 |
| $SO_4$ | 12.2 | 9.0 |
| $PO_4$ | 0.92 | 2.04 |
| $SiO_2$ | 22.4 | 6.38 |
| V | 0.06 | 0.47 |
| Mo | 0.82 | 0.04 |
| Fe | 1.14 | 2.35 |
| Al | 0.97 | 3.85 |
| Ni+Co | 3.18 | 5.44 |
| Mg | 1.36 | 4.4 |
| Ca | 0.95 | 0.60 |
| Pb | 4.12 | 0.06 |
| Mn | 0.30 | 0.05 |
| Cu | 0.35 | 1.81 |

The solid contents of the feed slurry may vary widely for the solvent extraction; however, in order to obtain optimal results the content should not be higher than 2 lbs./gal.; it also should not contain more than about 270 grams uranium per liter. Within these limits, feeds with a higher specific gravity have been found to yield a better uranium extraction than those of lower densities.

Organic solvents capable of extracting uranium from aqueous solutions are suitable for the process of this invention. Ethers, such as diethyl ether, nitromethane, ethyl benzoate and alkyl phosphates have given the most satisfactory results. The preferred solvent is tributyl phosphate, in particular when used in solution in an organic diluent. The concentration of the tributyl phosphate in the diluent, of course, has to be adjusted in accordance with the density of the slurry, because the solvent has to have a considerably lower specific gravity to obtain satisfactory phase separation. Kerosene is a very satisfactory diluent; a concentration of from 15 to 30% by volume of tributyl phosphate in kerosene has given the best results. Although diethyl ether performs highly satisfactorily, too, a considerably better uranium extraction and, at the same time, a lesser molybdenum and vanadium extraction occur with the tributyl phosphate-kerosene mixture.

The acidity of the feed may vary widely; but a low acidity results in a more efficient separation because less molybdenum, vanadium, silicon, phosphorus, etc. are then extracted.

The solvent may be used without any acid or it may contain acid up to about 5 N. The addition of acid is favorable in order to keep the acid content of the feed slurry at a constant value. However, it was found that in the case of diethyl ether as the extractant the lower the acidity content is the less vanadium and molybdenum values are extracted. In fact, for ether the excess acidity content, i. e. that "free acid" not formed by hydrolysis, is preferably from 0 to 1 N and in this case extraction is advantageously carried out with feed solutions in the range of no excess acid to a pH value of 1. Under these conditions optimal uranium extraction is achieved. The situation is slightly different, though, for tributyl phosphate as the solvent where a higher acid concentration yields better uranium extraction and lesser molybdenum and vanadium extraction. The optimal acid content for the feed in the case of tributyl phosphate as the solvent was found to be about 3.6 N.

It was also found that, if the uranium extraction was carried out with neutral ether, the extraction was still furthermore improved by adding iron ions to the slurry. The iron ions can be added in the form of various compounds; for instance, the addition of siderite ($FeCO_3$) or aniline sludge (mainly $Fe_2O_3$) has bene found satisfactory.

Any equipment customary for extraction processes can be used for carrying out the process of this invention. The process can be conducted either as a batch process or in a continuous manner; in the latter case countercurrent operation is preferred. For continuous countercurrent extraction, extraction columns give the best results. These columns may be equipped with jet mixers, such as they are described and claimed in copending application Serial No. 359,646, filed by James H. Yeager et al. on June 4, 1953. Another type of column which has given excellent results is the so-called pulse column, which is described and claimed in copending application Serial No. 325,003, filed on December 9, 1952, by Leland L. Burger. Also the Scheibel column, patented by U. S. Patent No. 2,493,265 to Edward G. Scheibel on January 3, 1950, has been used successfully.

The flow rate of the feed slurry through the columns may vary between 1 liter/hr. and 60 gals./hr. depending upon the size and type of the column. The optimum ratio of solvent:feed slurry was found to range between 1.8:1 and 3:1. Agitation is advantageous to obtain a more intense contact between the three media, and a stirrer speed of between 2500 and 3000 R. P. M. has given the best results. While either the aqueous slurry or the organic solvent may be the continuous phase, the latter is preferred.

Scrubbing can be carried out in the upper part of the extraction column, or else it may be done in a separate column. Demineralized water has been found best for the case of ether as solvent, while an acid, for instance nitric acid of a concentration of 8 N, was found most advantageous for tributyl phosphate extractant. A volume ratio of 13:1 for organic:aqueous medium has given the best results. In countercurrent operation it was found advantageous to carry out scrubbing at different temperatures; the part of the column where the fresh water or fresh acid is introduced is preferably held at room temperature, while at the portion of the column where the nonscrubbed extract contacts used scrubbing agent a temperature of about 50° C. is preferably maintained. Under these conditions the extraction of molybdenum, vanadium, cadmium and the like was kept at a minimum.

The extract solution obtained can then be processed by various customary methods for uranium recovery. The preferred procedure is back-extraction with an aqueous medium, preferably water. The back-extraction is improved if the temperature of the water is raised to about 50 to 100° C. The aqueous solution obtained thereby can then be treated by various methods; for instance, the aqueous solution can be evaporated to obtain uranyl nitrate hexahydrate or other uranium salt, depending upon the type of acid originally used, and the salt is then decomposed by heating to uranium oxide.

In the following, an example is given for the purpose of illustrating the high efficiency obtained with the process of this invention. The data given in this example are not to limit the scope of the invention.

*Example*

A pitchblende-"MgX" process slurry was extracted with a mixture of tributyl phosphate-naphtha in a continuous operation in a Scheibel column. Three runs were made each with a 30% tributyl phosphate-70% naphtha mixture. The aqueous feed slurry contained about 225 grams of uranium per liter. The extractions were carried out at a temperature of approximately 25° C., and agitation was applied with a speed of 2500 R. P. M. The scrub was always introduced at the top of the column, while the feed was introduced at about the center of the column. The organic phase was the continuous phase. In Table II the operating conditions and extraction results are given, while in Table III the contents of contaminants in the uranium are listed.

TABLE II

| Run No. | Ratio, Feed: Scrub:Organic | Feed, ml./hr. | HNO₃ Normality | | | | Raffinate U Conc., g./l. | Uranium | |
|---|---|---|---|---|---|---|---|---|---|
| | | | Feed [1] | Organic | Scrub | Raff.[1] | | Ext., Percent [2] | Metal Bal., Percent |
| 1 | 1.0:0.25:2.3 | 757 | 4.1 | 0.0 | 0.5 | 3.4 | 0.09 | 99.9 | 92 |
| 2 | 1.0:0.26:2.4 | 625 | 1.3 | 0.0 | [3] 0.0 | 1.0 | 0.49 | 99.8 | 100 |
| 3 | 1.0:0.21:2.4 | 840 | 1.3 | 0.34 | [3] 0.0 | 1.4 | 4.9 | 97.9 | 84 |

[1] "Excess HNO₃" expressed as normality.
[2] Based on raffinate and feed analyses.
[3] Water scrub.

TABLE III

| Run No. | Spectrographic Analyses, Uranium Basis, p. p. m. | | | | | | | | | | |
|---|---|---|---|---|---|---|---|---|---|---|---|
| | Mo | V | P | Cr | Co | Ni | Pb | B | Fe | Si | Cd | Cu |
| 1 | 20-100 | <20 | [4] N.D. | N. D. | N. D. | <50 | <40 | <1 | <20 | 10-50 | N. D. | <10 |
| 2 | 95 | <20 | <50 | 40 | <20 | <20 | <10 | <1 | <20 | 25 | <0.5 | 10 |
| 3 | 50 | <20 | <50 | 40 | <20 | <20 | <10 | <1 | <20 | 25 | <0.5 | 10 |

[4] Not detected.

Good uranium recovery and decontamination were obtained in each run.

It will be understood that the invention is not to be limited by the details given herein but that it may be modified within the scope of the appended claims.

What is claimed is:

1. A process for recovering uranium values from uranium-containing solid materials comprising adding a strongly ionizing acid to said materials, digesting said materials with said acid whereby a digest slurry is obtained, contacting said digest slurry with an organic substantially water-immiscible solvent whereby the uranium values of the solid as well as of the liquid part of the slurry are taken up by said solvent and an extract phase is formed, and separating said extract phase from a slurry raffinate.

2. The process of claim 1 wherein the acid is nitric acid.

3. The process of claim 2 wherein the solvent is tributyl phosphate.

4. The process of claim 3 wherein the tributyl phosphate is added in a mixture with a diluent and the tributyl phosphate content in said mixture is from 15 to 30% by volume.

5. The process of claim 2 wherein the solvent is ether and the acidity of the feed ranges from zero excess acid to an acidity yielding a pH of 1 and the acidity of the ether ranges from zero to a concentration of 1 N.

6. The process of claim 2 wherein the slurry contains about 2 lbs. of solids per gallon.

References Cited in the file of this patent

UNITED STATES PATENTS 2,227,833   Hixson et al. _____ Jan. 7, 1941